(12) United States Patent
Fujita

(10) Patent No.: US 9,789,734 B2
(45) Date of Patent: Oct. 17, 2017

(54) PNEUMATIC TIRE

(75) Inventor: Shungo Fujita, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 703 days.

(21) Appl. No.: 14/007,804

(22) PCT Filed: Mar. 26, 2012

(86) PCT No.: PCT/JP2012/057786
§ 371 (c)(1),
(2), (4) Date: Sep. 26, 2013

(87) PCT Pub. No.: WO2012/133334
PCT Pub. Date: Oct. 4, 2012

(65) Prior Publication Data
US 2014/0014246 A1 Jan. 16, 2014

(30) Foreign Application Priority Data
Mar. 28, 2011 (JP) .................. 2011-070864

(51) Int. Cl.
*B60C 11/03* (2006.01)
*B60C 11/12* (2006.01)

(52) U.S. Cl.
CPC ...... B60C 11/0306 (2013.01); B60C 11/0302 (2013.01); B60C 11/1236 (2013.01);
(Continued)

(58) Field of Classification Search
CPC ............ B60C 11/0302; B60C 11/0306; B60C 11/0309; B60C 11/11; B60C 11/1236;
(Continued)

(56) References Cited

U.S. PATENT DOCUMENTS

| | | | |
|---|---|---|---|
| 4,412,576 A | 11/1983 | Nakajima | |
| 2009/0320982 A1* | 12/2009 | Ochi | B60C 11/0306 152/209.25 |
| 2011/0073230 A1* | 3/2011 | Ishiguro | B60C 11/0302 152/209.18 |

FOREIGN PATENT DOCUMENTS

| | | |
|---|---|---|
| EP | 2230100 A1 | 9/2010 |
| JP | 47-005501 A | 3/1972 |

(Continued)

OTHER PUBLICATIONS

International Search Report, PCT/JP2012/057786, dated Jun. 26, 2012.

(Continued)

*Primary Examiner* — Michael H Wilson
*Assistant Examiner* — Philip N Schwartz
(74) *Attorney, Agent, or Firm* — Sughrue Mion, PLLC

(57) ABSTRACT

An object is to enhance traction performance and handling stability performance, these being related to braking performance and acceleration performance on snowy road surfaces. A tread (12) of a pneumatic tire (10) includes: two circumferential direction main grooves (14) that are formed further to the tire width direction inside from the tread (12) ground contact edge T than positions at ⅓ of the ground contact width W and that extend along the tire circumferential direction; a central land portion row (16) formed between the two circumferential direction main grooves (14); edge land portion rows (18) respectively formed at tire width direction outsides of the two circumferential direction main grooves (14; and main lug grooves (20) extending in the edge land portion rows (18) from the circumferential direction main grooves (14) towards the ground contact edges T. The edge land portion rows (18) are not formed with main grooves that place tire circumferential direction (Continued)

neighboring main lug grooves (20) in communication with each other.

2 Claims, 2 Drawing Sheets

(52) U.S. Cl.
CPC ............... *B60C 2011/0346* (2013.01); *B60C 2011/0372* (2013.01); *B60C 2011/0381* (2013.01); *B60C 2011/1209* (2013.01); *B60C 2011/1213* (2013.01)

(58) Field of Classification Search
CPC ..... B60C 2011/0388; B60C 2011/0381; B60C 2011/0358; B60C 2011/0372; B60C 2011/0346; B60C 2011/1209; B60C 2011/1213
See application file for complete search history.

(56) References Cited

FOREIGN PATENT DOCUMENTS

| | | | |
|---|---|---|---|
| JP | 05-338415 | A | 12/1993 |
| JP | 09-183303 | A | 7/1997 |
| JP | 11-129706 | A | 5/1999 |
| JP | 2006-218901 | A | 8/2006 |
| JP | 04-114713 | B2 | 7/2008 |
| JP | 4367965 | B1 * | 11/2009 ......... B06C 11/0302 |

OTHER PUBLICATIONS

Communication dated May 4, 2015 from the European Patent Office in counterpart application No. 12764216.3.

* cited by examiner

PNEUMATIC TIRE

CROSS REFERENCE TO RELATED APPLICATIONS

This application is a National Stage of International Application No. PCT/JP2012/057786 filed Mar. 26, 2012, claiming priority based on Japanese Patent Application No. 2011-070864 filed Mar. 28, 2011, the contents of all of which are incorporated herein by reference in their entirety.

TECHNICAL FIELD

The present invention relates to a pneumatic tire.

BACKGROUND ART

A pneumatic tire with a directional tread pattern including: two circumferential direction main grooves are provided on either side of a rib at a tread central portion; plural inclined main grooves that have inner edges in a region at 10% to 20% of a ground contact width from the tire center are provided at a specific pitch around the tire circumferential direction so as to incline towards diagonal outsides in a reverse direction to the specified rotation direction of the tire; and reverse inclined main grooves, that pass from the circumferential direction main grooves that are positioned to the outsides of the rib through the inner edges of the inclined main grooves, that connect to the outer end of the next adjacent inclined main groove partway, and that are inclined in a reverse direction to the inclined main grooves, has been disclosed (see Patent Document 1).

Patent Document 1: Japanese Patent No. 4114713

SUMMARY OF INVENTION

Technical Problem

Conventional treads (tire tread face portions) are partitioned into plural land portion rows by circumferential direction main grooves. In tread patterns that have a specified rotation direction, providing lug grooves in the land portion rows is a known technique for obtaining effective braking performance and acceleration performance on snow.

However, in tire patterns in which plural land portion rows are provided to a tread, the edges of the lug grooves are reduced when the circumferential direction main grooves cut across the lug grooves. Consideration must accordingly be given to the shapes of grooves in a tread.

In consideration of the above circumstances, an object of the present invention is to enhance traction performance, this being related to braking performance and acceleration performance on snowy road surfaces, and to enhance handling stability performance.

Solution to Problem

A first aspect of the present invention is a pneumatic tire with a tread including: two circumferential direction main grooves that are formed further to a tire width direction inside, from a tread ground contact edge, than positions at ⅓ of a ground contact width, and that extend along a tire circumferential direction; a central land portion row formed between the two circumferential direction main grooves; edge land portion rows respectively formed at tire width direction outsides of the two circumferential direction main grooves; and main lug grooves extending in the edge land portion rows from the circumferential direction main grooves towards the ground contact edges, wherein the edge land portion rows are not formed with main grooves that place tire circumferential direction neighboring main lug grooves in communication with each other.

In the pneumatic tire according to the first aspect, the two circumferential direction main grooves that are formed further to the tire width direction inside, from a tread ground contact edge, than positions at ⅓ of the ground contact width enable water discharge performance and snow discharge performance to be raised, and enable handling stability performance on snowy road surfaces to be enhanced.

The edges of the main lug grooves extending in the edge land portion rows from the circumferential direction main grooves towards the ground contact edges of the tread enable traction performance to be enhanced, this being related to braking performance and acceleration performance on snowy road surfaces.

In particular, since the edge land portion rows are not formed with main grooves that place tire circumferential direction neighboring main lug grooves in communication with each other, the main lug grooves are formed continuously with a long length, enabling a large edge effect to be obtained. Traction performance can accordingly be enhanced, this being related to braking performance and acceleration performance on snowy road surfaces.

A second aspect of the present invention is the pneumatic tire of the first aspect, wherein: the main lug grooves open onto the circumferential direction main grooves in an inclined state with respect to the tire width direction; and auxiliary grooves that, at opening positions of the main lug grooves onto the circumferential direction main grooves, are inclined in an opposite direction to the main lug grooves with respect to the tire circumferential direction, so as to intersect with the direction of the main lug grooves, and are formed from the edge land portion rows into the central land portion row so as to extend across the circumferential direction main grooves.

In the pneumatic tire according to the second aspect, the main lug grooves open onto the circumferential direction main grooves in an inclined state with respect to the tire width direction, and the auxiliary grooves are provided so as to intersect with the direction of the main lug grooves at the opening positions of the main lug grooves onto the circumferential direction main grooves. An edge effect that is related to braking performance and acceleration performance when running on snowy road surfaces can accordingly be obtained, and snow running performance can be further enhanced.

A third aspect of the present invention is the pneumatic tire of the second aspect, wherein the angle of inclination of the main lug grooves with respect to the tire circumferential direction is from 85 degrees to 30 degrees.

Note that the maximum value for the angle of inclination of the main lug grooves with respect to the tire circumferential direction is set at 85 degrees since above this value, a water discharging effect of the main lug grooves obtained due to rotating in a single direction only is degraded. The minimum value for the angle of inclination is set at 30 degrees since below this value, an edge effect with respect to input along the tire equatorial plane direction arising during acceleration and braking becomes insufficient.

In the pneumatic tire of the third aspect, the main lug grooves can achieve both a water discharge effect and an edge effect with respect to input along the tire equatorial plane direction arising during braking and during acceleration due to appropriately setting the angle of inclination of the main lug grooves with respect to the tire circumferential direction.

Advantageous Effects of Invention

As described above, the pneumatic tire of the first aspect obtains the excellent advantageous effect of enabling traction performance on snowy road surfaces to be enhanced, whilst suppressing a drop in braking performance and handling stability performance on dry road surfaces and icy road surfaces.

The pneumatic tire of the second aspect obtains the excellent advantageous effect of enabling snow running performance to be further enhanced.

The pneumatic tire of the third aspect obtains the excellent advantageous effect of enabling the main lug grooves to achieve both a water discharge effect and an edge effect with respect to input along the tire equatorial plane direction arising during braking and during acceleration.

DESCRIPTION OF EMBODIMENTS

Figure 1:
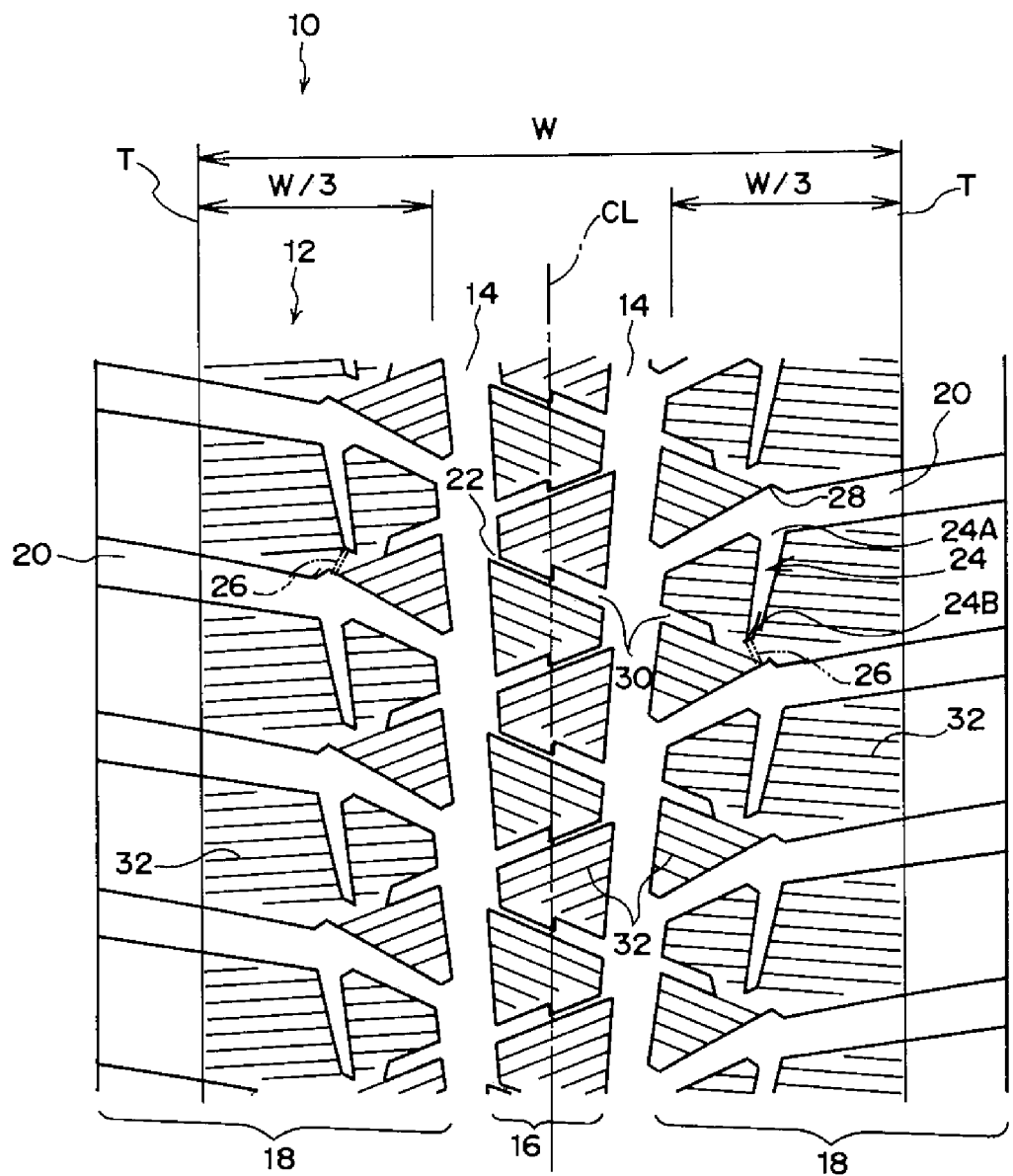
FIG. 1 is a plan view illustrating a tread pattern of a pneumatic tire according to a present exemplary embodiment.

Explanation follows regarding an exemplary embodiment of the present invention, with reference to the drawings. FIG. 1 illustrates a pneumatic tire 10 of the present exemplary embodiment with a tread 12 that is a tread face portion including plural circumferential direction main grooves 14, a central land portion row 16, edge land portion rows 18, and main lug grooves 20.

Two of the circumferential direction main grooves 14 are formed extending along the tire circumferential direction further to the tire width direction inside, from tread ground contact edges T of the tread 12, than positions at ⅓ of the ground contact width W. Note that the "ground contact edges T" are the tire width direction outermost edge portions of a ground contact region when the pneumatic tire 10 is mounted to a standard rim, as defined in the JATMA YEAR BOOK (2010 edition, Japan Automobile Tire Manufacturers Association standards), inflated to an internal pressure (maximum pressure) of 100% pressure corresponding to the maximum load (load shown in bold in the internal pressure-load correspondence table) for the internal pressure for the applicable JATMA YEAR BOOK size/ply rating, when the maximum load is applied thereto. Where the location of use or manufacturing location use TRA standards or ETRTO standards, then these respective standards are adhered to.

The central land portion row 16 is for example formed at a tire width direction central portion including a tire equatorial plane CL between the two circumferential direction main grooves 14. The central land portion row 16 is formed with fine grooves 22 and auxiliary grooves 30, described later. The fine grooves 22 are for example formed running along the extension directions of the auxiliary grooves 30 from terminal portions of the auxiliary grooves 30 inside the central land portion row 16 to the circumferential direction main grooves 14.

The edge land portion rows 18 are respectively formed to the tire width direction outsides of the two circumferential direction main grooves 14. The edge land portion rows 18 are formed with auxiliary grooves 24 that are slightly inclined with respect to the tire circumferential direction, with one ends 24A that open onto the neighboring main lug grooves 20 and other ends 24B that terminate inside the corresponding edge land portion rows 18. The groove width of the auxiliary grooves 24 is set smaller than that of the circumferential direction main grooves 14, and is for example configured so as to be widest at the one ends 24A, gradually decreasing on progression towards the other ends 24B.

The edge land portion rows 18 are not formed with main grooves that place the tire circumferential direction neighboring main lug grooves 20 in communication with each other. Since the auxiliary grooves 24 do not open onto neighboring main lug grooves 20 around the tire circumferential direction, the rigidity of the land portions is not degraded, thereby enabling a drop in braking performance and acceleration performance to be prevented. Moreover, since the auxiliary grooves 24 do not open onto neighboring main lug grooves 20 around the tire circumferential direction, edges are formed from the circumferential direction main grooves 14 as far as the ground contact edges T of the tread 12, giving good traction over snow.

Note that sipes 26 may be provided between the other ends 24B of the auxiliary grooves 24 and the neighboring main lug grooves 20 on the side of the other ends 24B, as shown by the double-dotted dashed lines. The sipes 26 are for example configured with a groove width that is a zero groove width when the tread 12 makes ground contact, or may be configured in slit shapes that do not have a groove width. The sipes 26 enable water discharge performance to be raised. Note that configuration is made such that when running over snowy road surfaces, snow inside the auxiliary grooves 24 is not able to escape through the sipes 26 into the main lug grooves 20, so there is no drop in traction performance.

The main lug grooves 20 extend from the circumferential direction main grooves 14 towards the ground contact edges T in the edge land portion rows 18, and for example open onto the circumferential direction main grooves 14 in a state inclined with respect to the tire width direction. An angle of inclination θ of the main lug grooves 20 with respect to the tire circumferential direction is for example from 85 degrees to 30 degrees. Note that the maximum value for the angle of inclination of the main lug grooves 20 with respect to tire circumferential direction is set at 85 degrees since above this value, a water discharging effect of the main lug grooves 20 obtained due to rotating in a single direction only is degraded. The minimum value for the angle of inclination is set at 30 degrees since below this value, an edge effect with respect to input along the tire equatorial plane direction arising during acceleration and braking becomes insufficient.

Step portions 28 are formed to the main lug grooves 20 at positions opposing to the one ends 24A of the auxiliary grooves 24. The step portions 28 suppress movement of snow inside the main lug grooves 20 when running on snowy road surfaces, and also enable snow to be compacted between the step portions 28 and the auxiliary grooves 24.

The auxiliary grooves 30 are formed at the opening portions of the main lug grooves 20 onto the circumferential direction main grooves 14. The auxiliary grooves 30 are inclined in an opposite direction to the main lug grooves 20 with respect to the tire circumferential direction so as to intersect with the direction of the main lug grooves 20. The auxiliary grooves 30 are formed from the edge land portion rows 18 into the central land portion row 16 in for example a straight line shape so as to extend across the circumferential direction main grooves 14.

Tire width direction central side end portions of the auxiliary grooves 30 are for example positioned in the vicinity of the tire equatorial plane CL. The width direction outside end portions of the auxiliary grooves 30 are for example positioned extending towards the step portions 28 of the main lug grooves 20, however the auxiliary grooves 30 do not open onto the main lug grooves 20 or the auxiliary grooves 24, but terminate in the edge land portion rows 18. The rigidity of the land portions is accordingly not degraded, enabling a drop in braking performance and acceleration performance to be prevented.

Note that sipes 32 may be formed to the central land portion row 16 and the edge land portion rows 18 as appropriate. The shape and number of the sipes 32 is not limited to the example illustrated in the drawings, and may be set as desired.

Note that in the above configuration, the main lug grooves 20 open onto the circumferential direction main grooves 14 in an inclined state with respect to the tire width direction, however there is no limitation thereto, the main lug grooves 20 may be formed along the tire width direction. Configuration may also be made wherein the auxiliary grooves 30 are not provided. The angle of inclination θ of the main lug grooves 20 with respect to the tire circumferential direction is illustrated within the value range described above, however configuration outside of this value range is also possible.

Operation

Explanation follows regarding operation of the present exemplary embodiment configured as described above. In FIG. 1, in the pneumatic tire 10 of the present exemplary embodiment the two circumferential direction main grooves 14 formed further to the tire width direction inside than positions ⅓ of the ground contact width W from the ground contact edges T of the tread 12 increase water discharge performance and snow discharge performance, enabling handling stability performance to be enhanced on snowy road surfaces. The circumferential direction main grooves 14 also enable a reduction in noise to be achieved.

In addition, in the edge land portion rows 18, the edges of the main lug grooves 20 that extend from the circumferential direction main grooves 14 to the ground contact edges T of the tread 12 enable traction performance to be enhanced, this being related to braking performance and acceleration performance on snowy road surfaces. In particular, since the edge land portion rows 18 are not formed with main grooves that place tire circumferential direction neighboring main lug grooves 20 in communication with each other, the main lug grooves 20 are formed continuously with a long length, enabling a large edge effect to be obtained, this being related to braking performance and acceleration performance.

Moreover, in the present exemplary embodiment, the main lug grooves 20 open onto the circumferential direction main grooves 14 in an appropriately inclined state with respect to the tire width direction. Due to providing the auxiliary grooves 30 that intersect with the direction of the main lug grooves 20 at the positions where the main lug grooves 20 open onto the circumferential direction main grooves 14, an even larger edge effect can be obtained when running on snowy road surfaces. Shear force from snow columns is increased since snow is compacted inside the auxiliary grooves 24 provided to the edge land portion rows 18. The main lug grooves 20 are able to achieve both a water discharge effect and an edge effect with respect to input along the tire equatorial plane direction arising during braking and during acceleration due to the angle of inclination θ of the main lug grooves 20 being set appropriately with respect to the tire circumferential direction.

The present exemplary embodiment can accordingly greatly enhance traction performance, this being related to braking performance and acceleration performance on snowy road surfaces, as well as handling stability performance.

Test Example

Figure 2:
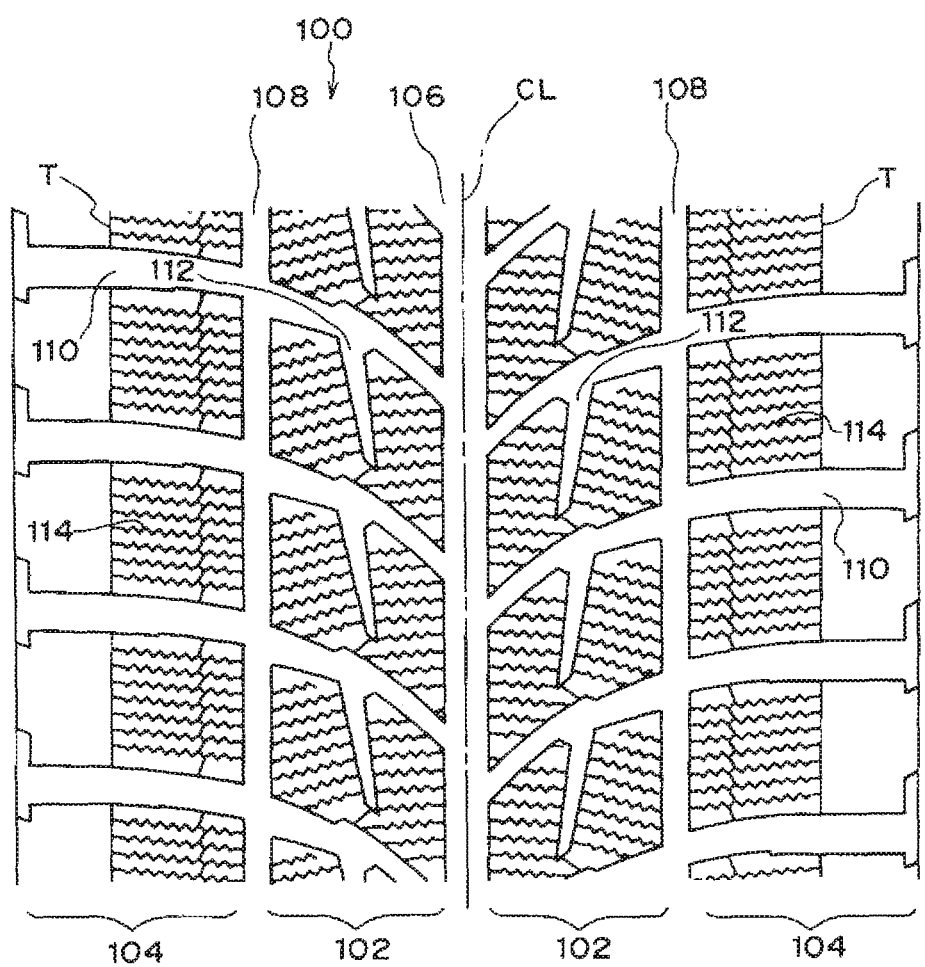
FIG. 2 is a plan view illustrating a tread pattern of a pneumatic tire according to a conventional example.

Testing is performed for the various evaluation criteria shown in Table 2 on the pneumatic tire 10 of a Test Example of the tread pattern illustrated in FIG. 1, that includes circumferential direction main grooves, main lug grooves, and auxiliary grooves configured as set out in Table 1, and on a conventional pneumatic tire 100 of the tread pattern illustrated in FIG. 2, that includes auxiliary grooves configured as set out in Table 1. The tire size is 195/65R15 (tread width 162 mm), internal pressure is 220 kPa, and load corresponds to two occupants. Note that in FIG. 2, 102 are central land portion rows, 104 are edge land portion rows, 106 and 108 are circumferential direction main grooves, 110 are main lug grooves, 112 are auxiliary grooves, 114 are sipes, and T indicates the ground contact edges.

Brief explanation follows regarding the evaluation methods employed for each of the evaluation criteria set out in Table 2.

Wet Road Surface

Hydroplaning is evaluated by test driver feeling at a hydroplaning occurrence threshold speed when running on a straight wet road surface with a water depth of 5 mm.

Braking performance is evaluated by the braking distance for the vehicle to come to a standstill when the brakes are fully applied in a state running at 80 km/h on a straight wet road surface with a water depth of 2 mm.

Dry Road Surface

Braking performance is evaluated by the braking distance for the vehicle to come to a standstill when the brakes are fully applied in a state running at 80 km/h on a dry road surface. Handling stability performance is evaluated by test driver feeling for various running modes when sports running on a circuit course in a dry state.

Snowy Road Surface

Traction performance is evaluated by the time required to accelerate from 10 km/h to 45 km/h on a snowy road surface. Braking performance is evaluated by the braking distance for the vehicle to come to a standstill when the brakes are fully applied in a state running at 40 km/h on a snowy road surface.

Handling stability performance is evaluated by overall test driver feeling for braking performance, start-up performance, straight ahead running performance, and cornering performance on a test course with a compacted snow road surface.

Handling stability performance is evaluated by overall test driver feeling for braking performance, start-up performance, straight ahead running performance, and cornering performance on a test course with a frozen road surface.

The results illustrated in Table 2 are shown employing an index wherein the Conventional Example is given a value of 100 for each of the evaluation criteria, and the higher the value, the better the result. As illustrated in Table 2, the tire of the Test Example outperforms the tire of the Conventional Example for each of the evaluation criteria. It can be confirmed that the tire of the Test Example enhances snow performance whilst maintaining braking performance and handling stability performance on wet road surfaces, and dry road surfaces.

TABLE 1

|  |  | Width (mm) | Groove Angle (°) | Groove depth (mm) |
|---|---|---|---|---|
| Test Example | Circumferential direction groove | 11 | 0 | 8 |
|  | Main lug groove | 9-5 | 95-65 | 8 |
|  | Auxiliary Groove | 4.5 | 80 | 6 |
| Conventional Example | Auxiliary Groove | 2.5-5 | 81 | 7 |

TABLE 2

|  |  | Conventional Example | Test Example |
|---|---|---|---|
| Wet Road Surface | Hydroplaning (straight line) | 100 | 100 |
|  | Braking performance (straight line) | 100 | 100 |
|  | Handling stability performance | 100 | 100 |
| Dry Road Surface | Braking performance (straight line) | 100 | 100 |
|  | Handling stability performance | 100 | 100 |
| Snowy Road Surface | Traction performance | 100 | 120 |
|  | Braking performance | 100 | 120 |
|  | Handling stability performance | 100 | 115 |

EXPLANATION OF THE REFERENCE NUMERALS

10 pneumatic tire
12 tread
14 circumferential direction main grooves
16 central land portion row
18 edge land portion rows
20 main lug grooves
30 auxiliary grooves
θ angle of inclination

The invention claimed is:
1. A pneumatic tire with a tread, the tread comprising:
two circumferential direction main grooves that are formed further to a tire width direction inside, from a tread ground contact edge, than positions at ⅓ of a ground contact width, and that extend along a tire circumferential direction;
a central land portion row formed between the two circumferential direction main grooves;
edge land portion rows respectively formed at tire width direction outsides of the two circumferential direction main grooves;
main lug grooves extending in the edge land portion rows from the circumferential direction main grooves towards the ground contact edges, opening onto the circumferential direction main grooves in an inclined state with respect to the tire width direction;
first auxiliary grooves that, at opening positions of the main lug grooves onto the circumferential direction main grooves, are inclined in an opposite direction to the main lug grooves with respect to the tire circumferential direction, so as to intersect with the direction of the main lug grooves, are formed from the edge land portion rows into the central land portion row so as to extend across the circumferential direction main grooves, and do not open onto the main lug grooves, tire width direction central side end portions are positioned in the vicinity of the tire equatorial plane, and tire width direction outside end portions terminate in the edge land portion rows;
second auxiliary grooves that are inclined with respect to the tire circumferential direction, each with one end that opens onto the neighboring main lug groove and another end that terminates inside the corresponding edge land portion row, wherein
the edge land portion rows are not formed with main grooves that place tire circumferential direction neighboring main lug grooves in communication with each other.
2. The pneumatic tire of claim 1, wherein the angle of inclination of the main lug grooves with respect to the tire circumferential direction is from 85 degrees to 30 degrees.

* * * * *